July 24, 1956

C. D. ARCHER 2,755,674

RATCHET WINCH

Filed May 22, 1953

INVENTOR.
CLARENCE D. ARCHER,
BY
McMorrow, Berman + Davidson
ATTORNEYS.

United States Patent Office 2,755,674
Patented July 24, 1956

2,755,674

RATCHET WINCH

Clarence D. Archer, Knights Landing, Calif.

Application May 22, 1953, Serial No. 356,858

2 Claims. (Cl. 74—142)

This invention relates to ratchet winches and more particularly to manually operated, releasable winches for manually lifting a load on a supporting structure and releasing the load to descend from the supporting structure, when desired.

It is among the objects of the invention to provide a manually operated ratchet winch which is particularly adapted for single or multiple use on supporting structures, such as agricultural implement transporting trailers, to raise the implements, such as harrows or plows, above the ground and support them in elevated position on the trailer for transportation, and lower the implements to the ground for removal of the trailer therefrom and use of the implements; which can be mounted upon or incorporated into an implement transporting trailer; which can be easily operated and released manually; which is positively locked against accidental release and can be released only by manual operation of its controls; and which is simple and durable in construction, economical to manufacture and install, and positive and effective in operation.

Other objects and advantages will become apparent from a consideration of the following description and the appended claims in conjunction with the accompanying drawing wherein:

Figure 1:
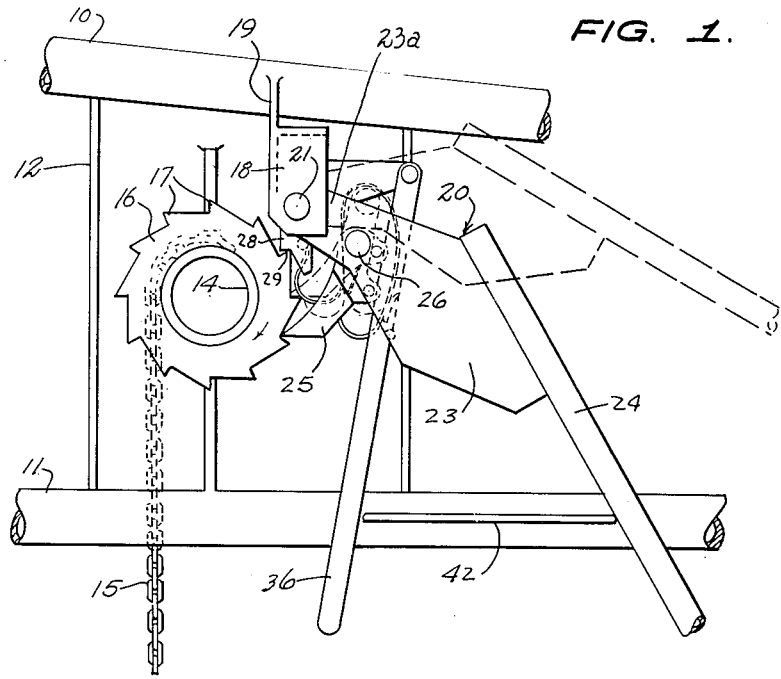
Figure 1 is an end elevational view of a ratchet winch illustrative of the invention with the parts in operative position to wind the winch.

With continued reference to the drawing, the numerals 10 and 11 indicate the vertically spaced apart side rails at one side of a supporting structure, such as an agricultural implement transporting trailer, it being understood that a similar pair of vertically spaced apart side rails is disposed at the opposite sides of the trailer. A supporting or bearing plate 12 extends between and is secured at its upper and lower ends respectively, to the side rails 10 and 11 and is provided with a substantially centrally disposed opening in which a bearing sleeve 13 is secured. A similar bearing plate will be disposed between the side rails at the opposite side of the trailer and will carry a bearing sleeve similar to the sleeve 13.

A cylindrical drum 14 is journaled at its ends in the bearing sleeve and is substantially horizontally disposed for rotation about its longitudinal center line as an axis. Chains or similar flexible strands, as indicated at 15, are wound at corresponding ends on the drum 14 and are provided at their opposite ends with hooks or similar fasteners, by means of which the chains are engaged with agricultural implements disposed below the frame of the transporting trailer, so that the implements can be raised relative to the trailer when the drum is rotated to wind the chains thereon. A single winding drum may be used for some purposes, but in other installations, the drums will be provided in multiple at locations spaced apart along the trailer frame and with their rotational axes substantially in a horizontal plane and substantially parallel to each other.

One end of the drum 14 projects outwardly of the end of the bearing bushing or sleeve 13 at the outer side of the plate 12, and a ratchet wheel 16 is secured on this projecting end portion of the drum and is provided with ratchet teeth 17 around the periphery thereof. A bracket 18 is positioned rearwardly of and spaced from the ratchet wheel 16 and is mounted on the plate 12 and may also be connected to the top rail 10, as indicated at 19.

The hand lever 20 including a plate 23 having a fingertip 23a and a handle 24 is positioned so that the tip of the finger is adjacent the bracket 18 with the handle 24 spaced longitudinally rearwardly from the ratchet wheel 16, the tip of the finger being connected to the bracket 18 for pivotal movement about a second horizontal axis or pin 21 which is parallel to the first axis or axis of the ratchet wheel 16.

An upstanding pawl 25 has the upper end connected to the hand lever plate 23 for pivotal movement about a third horizontal axis or pin 26 which is parallel to the second axis or pin 21 and has the lower end beveled to a toothed edge and engageable with the teeth 17 of the ratchet wheel 16 to impart rotational movements to the ratchet wheel and the drum 14 when the hand lever 20 is swung about the pivot pin 21.

An upstanding dog 28 is positioned above the pawl 25 and has the upper end connected to the second axis or pin 21 for pivotal movement thereabout and has the lower end provided with a sear formation 29 which engages with the teeth 17 of the ratchet wheel 16 to hold the ratchet wheel against reverse rotation whenever the ratchet wheel is rotated in the predetermined direction by the hand lever 20 and the pawl 25.

An elongated and longitudinally curved leaf spring 30 is pivotally secured at one end to the pawl 25, as indicated at 31, intermediate the length of the side of the pawl remote from the ratchet wheel 16, and the spring is then looped toward the free end of the pawl, as indicated at 32, is then looped around the third axis or pivot pin 26, as indicated at 33, is then looped back toward the free end of the pawl, as indicated at 34, and then is pivotally secured to the locking dog 28 near the free end of the dog, as indicated at 35.

A control lever 36 is arranged in divergent relation with respect to the lever handle 20 and has the convergent end connected to the bracket 18 for pivotal movement about a fourth horizontal axis or pin 38 which is parallel to the third axis or pin 26. Means or a spring abutment 40 is mounted on the control lever 36 intermediate the length of this control lever and is engageable with the loop 32 at the side of this loop remote from the pawl 25, when the control lever 36 is in one predetermined position, as illustrated in Figure 1.

When the control lever 36 is in the position illustrated in Figure 1, the abutment 40 bears against the portion of the spring 30 most remote from the ratchet wheel 16, and conditions the spring to resiliently urge the pawl 25 and the locking dog 28 into engagement with the teeth 17 of the ratchet wheel. When the control lever is in this position, and the handle 24 of the hand lever 20 is raised, the pawl 25 will be moved reversely around the periphery of the ratchet wheel 17 and after it has passed the face edge of a ratchet wheel tooth, the handle may be pulled downwardly and the pawl will cause the ratchet wheel to rotate in a predetermined direction. The tooth next to the tooth engaged by the locking dog 28 will now move past the locking dog and, when the face edge of this tooth has passed the sear formation 29 of the locking dog, the handle may be released and the locking dog will engage the adjacent tooth face and hold the ratchet wheel in the new rotational position. The hand lever handle 24 may now be raised to engage the pawl 25 with a new or successive tooth on the ratchet wheel, and then pulled downward to further rotate the ratchet wheel and this operation can be repeated until the drum 14 has been turned the desired amount.

Figure 2:
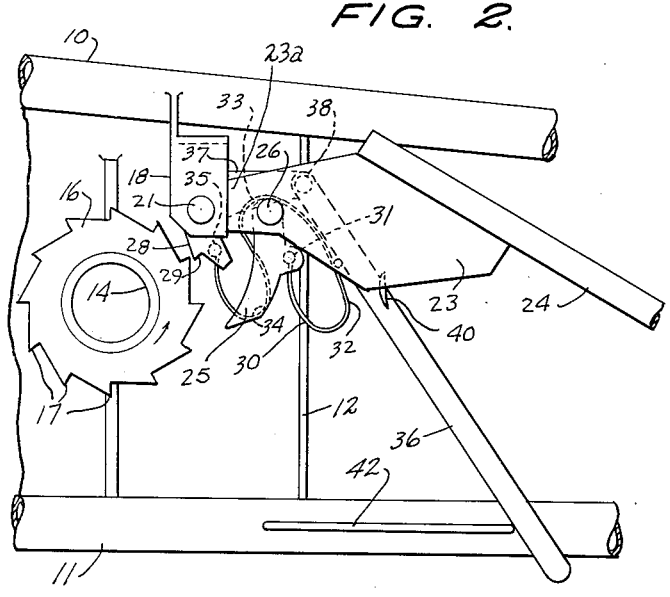
Figure 2 is an end elevational view similar to Figure 1 showing the parts in operative position to release the winch.
Figure 3:
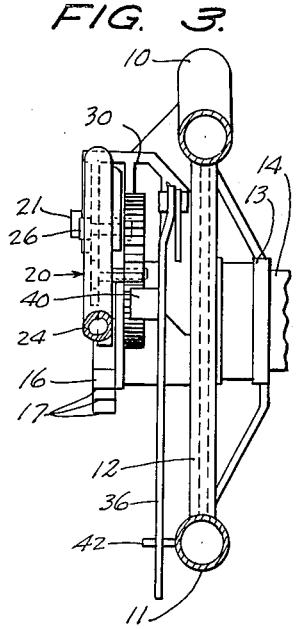
Figure 3 is a fragmentary side elevational view of the winch illustrated in Figures 1 and 2.

When it is desired to release the drum, for unwinding the chains 15 and lowering the implements from the trailer, the control lever 24 is first moved from the position illustrated in Figure 1 to that illustrated in Figure 2, removing the abutment 40 from the spring 30 and freeing the spring. The shape of the spring is now such that the spring resiliently urges the pawl 25 and the locking dog 28 away from the teeth of the ratchet wheel. The locking dog will, however, be held in engagement with the associated ratchet wheel tooth by the pressure between the tooth and the sear formation of the locking dog and, in order to release the ratchet wheel and the drum, the handle 24 of the hand lever is pulled downwardly, the pawl 25 being first manually engaged with the adjacent ratchet wheel tooth, if necessary, and as soon as the pressure between the locking dog and the associated ratchet wheel tooth has been released, the spring 30 will move the locking dog out of engagement with the ratchet wheel tooth, as illustrated in Figure 2. The hand lever 20 is then permitted to swing upwardly beyond its normal uppermost position and until the pawl 25 is withdrawn from the associated ratchet wheel tooth, thereby freeing the ratchet wheel 16 and drum 14 for free rotation.

A rib or bar 42 is mounted on and extends longitudinally of the bottom rail 11 and has one end releasably engaging the control lever 36 when the control lever is in the position illustrated in Figure 1, and its other end releasably engaging the control lever when the control lever is in its position as illustrated in Figure 2. The control lever is thus releasably held in either of its operative positions by the bar 42 and, when the control lever is held in its position resiliently engaging the pawl and the locking dog with the teeth of the ratchet wheel, the ratchet wheel cannot be released for free rotation until the control lever is moved to its alternative operative position.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A ratchet mechanism comprising a supporting plate, a ratchet wheel journaled in said plate for rotation about a horizontal axis, a bracket positioned rearwardly of and spaced from said wheel and carried by said plate, a hand lever including a plate having a finger and a handle positioned so that the tip of the finger is adjacent said bracket with the handle spaced longitudinally rearwardly from said ratchet wheel, the tip of the finger being connected to said bracket for pivotal movement about a second horizontal axis parallel to said first axis, an upstanding pawl having the upper end connected to said hand lever plate for pivotal movement about a third horizontal axis parallel to said second axis and having the lower end engageable with the teeth of said ratchet wheel to impart rotational movement in one direction to said ratchet wheel upon swinging movement of said hand lever, an upstanding locking dog positioned above said pawl and having the upper end connected to said second named axis for pivotal movement thereabout and having the lower end engageable with the teeth of said ratchet wheel to restrain said ratchet wheel against reverse rotation, a longitudinally curved leaf spring having one end connected to said pawl intermediate its ends and having the other end connected with said dog with the intermediate portion looped about said third axis, a control lever arranged in divergent relation with respect to said lever handle and having the convergent end connected to said bracket for pivotal movement about a fourth horizontal axis parallel to said third axis, and means on said control lever intermediate the ends thereof and engageable with said spring.

2. A ratchet mechanism comprising a supporting plate, a ratchet wheel journaled in said plate for rotation about a horizontal axis, a bracket positioned rearwardly of and spaced from said wheel and carried by said plate, a hand lever including a plate having a finger and a handle positioned so that the tip of the finger is adjacent said bracket with the handle spaced longitudinally rearwardly from said ratchet wheel, the tip of the finger being connected to said bracket for pivotal movement about a second horizontal axis parallel to said first axis, an upstanding pawl having the upper end connected to said hand lever plate for pivotal movement about a third horizontal axis parallel to said second axis and having the lower end engageable with the teeth of said ratchet wheel to impart rotational movement in one direction to said ratchet wheel upon swinging movement of said hand lever, an upstanding locking dog positioned above said pawl and having the upper end connected to said second named axis for pivotal movement thereabout and having the lower end engageable with the teeth of said ratchet wheel to restrain said ratchet wheel against reverse rotation, a longitudinally curved leaf spring having one end connected to said pawl intermediate its ends and having the other end connected with said dog with the intermediate portion looped about said third axis, an extension projecting longitudinally of said bracket, a control lever arranged in divergent relation with respect to said lever handle and having the convergent end connected to said extension for pivotal movement about a fourth horizontal axis parallel to said third axis, and an abutment on said control lever intermediate the ends thereof and engageable with said spring.

References Cited in the file of this patent

UNITED STATES PATENTS

| | | |
|---|---|---|
| 325,614 | Lancaster | Sept. 1, 1885 |
| 894,441 | Joyce | July 28, 1908 |
| 2,051,832 | Edelblute | Aug. 25, 1936 |
| 2,119,028 | Schmidt et al. | May 31, 1938 |
| 2,470,019 | Coffing | May 10, 1949 |